United States Patent
Foley et al.

(10) Patent No.: US 10,521,145 B1
(45) Date of Patent: Dec. 31, 2019

(54) METHOD, APPARATUS AND COMPUTER PROGRAM PRODUCT FOR MANAGING DATA STORAGE

(71) Applicant: EMC IP Holding Company LLC, Hopkinton, MA (US)

(72) Inventors: Robert Foley, Clinton, MA (US); Steven A. Morley, Mendon, MA (US); Daniel Cummins, Hudson, NH (US)

(73) Assignee: EMC IP Holding Company LLC, Hopkinton, MA (US)

( * ) Notice: Subject to any disclaimer, the term of this patent is extended or adjusted under 35 U.S.C. 154(b) by 151 days.

(21) Appl. No.: 15/799,175

(22) Filed: Oct. 31, 2017

(51) Int. Cl.
- *G06F 11/00* (2006.01)
- *G06F 3/06* (2006.01)
- *G06F 11/20* (2006.01)

(52) U.S. Cl.
CPC .......... *G06F 3/0644* (2013.01); *G06F 3/0604* (2013.01); *G06F 3/0689* (2013.01); *G06F 11/2094* (2013.01); *G06F 2201/805* (2013.01); *G06F 2201/82* (2013.01)

(58) Field of Classification Search
CPC .... G06F 3/0644; G06F 3/0604; G06F 3/0689; G06F 3/0629; G06F 3/0683; G06F 11/2094; G06F 11/2089; G06F 2201/805; G06F 2201/82; G06F 2211/1026; G06F 2211/1028; G06F 2211/104; G06F 2211/1073; G06F 2211/1095; G06F 2212/261; G06F 2212/262
See application file for complete search history.

(56) References Cited

U.S. PATENT DOCUMENTS

| | | | | |
|---|---|---|---|---|
| 6,954,824 B2* | 10/2005 | Burton | ................. | G06F 3/0601 711/112 |
| 6,985,995 B2* | 1/2006 | Holland | .............. | G06F 11/1076 707/999.202 |
| 10,140,041 B1* | 11/2018 | Dong | .................... | G06F 3/0619 |
| 2008/0133831 A1* | 6/2008 | Delaney | ................ | G06F 3/0613 711/114 |
| 2008/0201524 A1* | 8/2008 | Petrescu | ............... | G06F 3/0613 711/114 |
| 2014/0351512 A1* | 11/2014 | Xu | ........................ | G06F 3/0604 711/114 |
| 2015/0286531 A1* | 10/2015 | Bondurant | ............. | G11B 5/012 714/6.23 |
| 2016/0335008 A1* | 11/2016 | Dasar | .................... | G06F 3/0632 |
| 2017/0315753 A1* | 11/2017 | Blount | .................. | G06F 3/0649 |

* cited by examiner

*Primary Examiner* — Anthony J Amoroso
(74) *Attorney, Agent, or Firm* — Krishnendu Gupta; Nikhil Patel

(57) ABSTRACT

There is disclosed herein techniques for managing data storage. In one exemplary embodiment, the techniques comprise generating one or more sets of storage devices. Each set is configured to be mutually exclusive with respect to other sets of the one or more sets such that storage devices within the same set provide the basis for the formation of a RAID (Redundant Arrays of Independent Disks) stripe. The techniques further comprise forming a RAID stripe from respective storage extents associated with different storage devices of the same set. The techniques further comprise mapping a storage object to the RAID stripe. The techniques further comprise servicing host I/O (Input/Output) operations directed to the storage object by using the RAID stripe mapped thereto.

17 Claims, 3 Drawing Sheets

METHOD, APPARATUS AND COMPUTER PROGRAM PRODUCT FOR MANAGING DATA STORAGE

TECHNICAL FIELD

The present invention relates generally to data storage. More particularly, the present invention relates to a method, an apparatus and a computer program product for managing data storage.

BACKGROUND OF THE INVENTION

Data storage systems are arrangements of hardware and software that include storage processors coupled to arrays of non-volatile storage devices, such as magnetic disk drives, electronic flash drives, and/or optical drives, for example. The storage processors service storage requests, arriving from host machines ("hosts"), which specify files or other data elements to be written, read, created, deleted, and so forth. Software running on the storage processors manages incoming storage requests and performs various data processing tasks to organize and secure the data elements stored on the non-volatile storage devices.

Data storage systems commonly provide disk drives in arrangements called "RAID groups" (RAID is an acronym for Redundant Array of Independent Disks). Common RAID configurations mirror data between disk drives and/or provide parity segments to establish redundancy. Mirroring and parity enable a RAID group to suffer a failure of a disk drive without experiencing data loss. For example, a system using RAID mirroring may access data of a failed disk drive from a surviving mirror drive. A system using parity may compute missing data based on a combination of data from surviving drives, e.g., by performing exclusive-OR operations on corresponding elements of the surviving drives.

When a disk drive in a RAID group fails, RAID protocols may initiate a repair operation. For example, a system may swap out the failed drive with a spare and begin copying data to the spare drive. In cases where parity is used, the system may compute data for the spare drive from remaining drives and store the computed data in the spare drive. These actions have the effect of restoring redundancy to the RAID group, such that it can suffer another disk drive failure without experiencing data loss.

Unfortunately, conventional approaches for repairing RAID groups after disk drive failures can be burdensome. For example, upon failure of a drive, the rebuild will require reading data from the remaining drives and copying the reconstructed data to a spare drive which may have limited write performance. The speed of rebuilding will, therefore, be bottlenecked by the maximum write throughput for writing the reconstructed data to the spare drive, which increases the risk of permanent data loss if an additional drive should fail before the rebuild process is completed. In other words, bottlenecks can result in long rebuild times, during which the fault tolerance of the group is degraded, creating an increased risk of data loss. Further, the rebuild time increases as the total capacity of individual physical drives in the RAID group grows, adding to the significance of the problem.

To address some of these problems, many data storage systems have begun to adopt mapped RAID techniques. In mapped. RAID, the data storage systems distribute data across RAID extents which are made up of disk extents such that the disk extents of each RAID extent are provided by different physical storage drives. As a result, Mapped RAID allocates spare disk extents distributed across a large pool of drives in the data storage system rather than reserve one or more entire physical drives as spares. Consequently, rebuilding data from a failed drive involves writing data to spare disk extents distributed across multiple drives. Because rebuilding mapped RAID data involves writing to multiple drives in parallel (rather than to a single drive), the speed of the rebuild process is no longer limited by the minimum time required to write all the rebuilt data to a single drive.

It should, however, be appreciated that mapped RAID also has some problems. For example, as discussed above, mapped RAID is a technology which provides for an extent based fully mapped RAID solution where all the extents are dynamically mapped and maintained across an arbitrary number of devices. Thus, the RAID stripes in this model are spread out across all the drives in the system. If there is a large number of drives in the system then it means that that the data is spread out over a large failure domain. If a single drive fails, and a rebuild is needed, the failure domain is all the drives in the system. There is, therefore, a need to address at least this problem.

SUMMARY OF THE INVENTION

There is disclosed a method, comprising: generating one or more sets of storage devices, wherein each set is configured to be mutually exclusive with respect to other sets of the one or more sets such that storage devices within the same set provide the basis for the formation of a RAID (Redundant Arrays of Independent Disks) stripe; forming a RAID stripe from respective storage extents associated with different storage devices of the same set; mapping a storage object to the RAID stripe; and servicing host I/O (Input/Output) operations directed to the storage object by using the RAID stripe mapped thereto.

There is also disclosed an apparatus, comprising: memory; and processing circuitry coupled to the memory, the memory storing instructions which, when executed by the processing circuitry, cause the processing circuitry to: generate one or more sets of storage devices, wherein each set is configured to be mutually exclusive with respect to other sets of the one or more sets such that storage devices within the same set provide the basis for the formation of a RAID (Redundant Arrays of independent Disks) stripe; form a RAID stripe from respective storage extents associated with different storage devices of the same set; map a storage object to the RAID stripe; and service host I/O (Input/Output) operations directed to the storage object by using the RAID stripe mapped thereto.

There is also disclosed a compater program product having a non-transitory computer readable, medium which stores a set of instructions, the set of instructions, when carried out by processing circuitry, causing the processing circuitry to perform a method of: generating one or more sets of storage devices, wherein each set is configured to be mutually exclusive with respect to other sets of the one or more sets such that storage devices within the same set provide the basis for the formation of a RAID (Redundant Arrays of Independent Disks) stripe; forming a RAID stripe from respective storage extents associated with different storage devices of the same set; mapping a storage object to the RAID stripe; and servicing host I/O (Input/Output) operations directed to the storage object by using the RAID stripe mapped thereto.

BRIEF DESCRIPTION OF THE DRAWINGS

The invention will be more clearly understood from the following description of preferred embodiments thereof, which are given by way of examples only, with reference to the accompanying drawings, in which.

DETAILED DESCRIPTION

Embodiments of the invention will now be described. It should be appreciated that such embodiments are provided by way of example to illustrate certain features and principles of the invention but that the invention hereof is not limited to the particular embodiments described.

Figure 1:
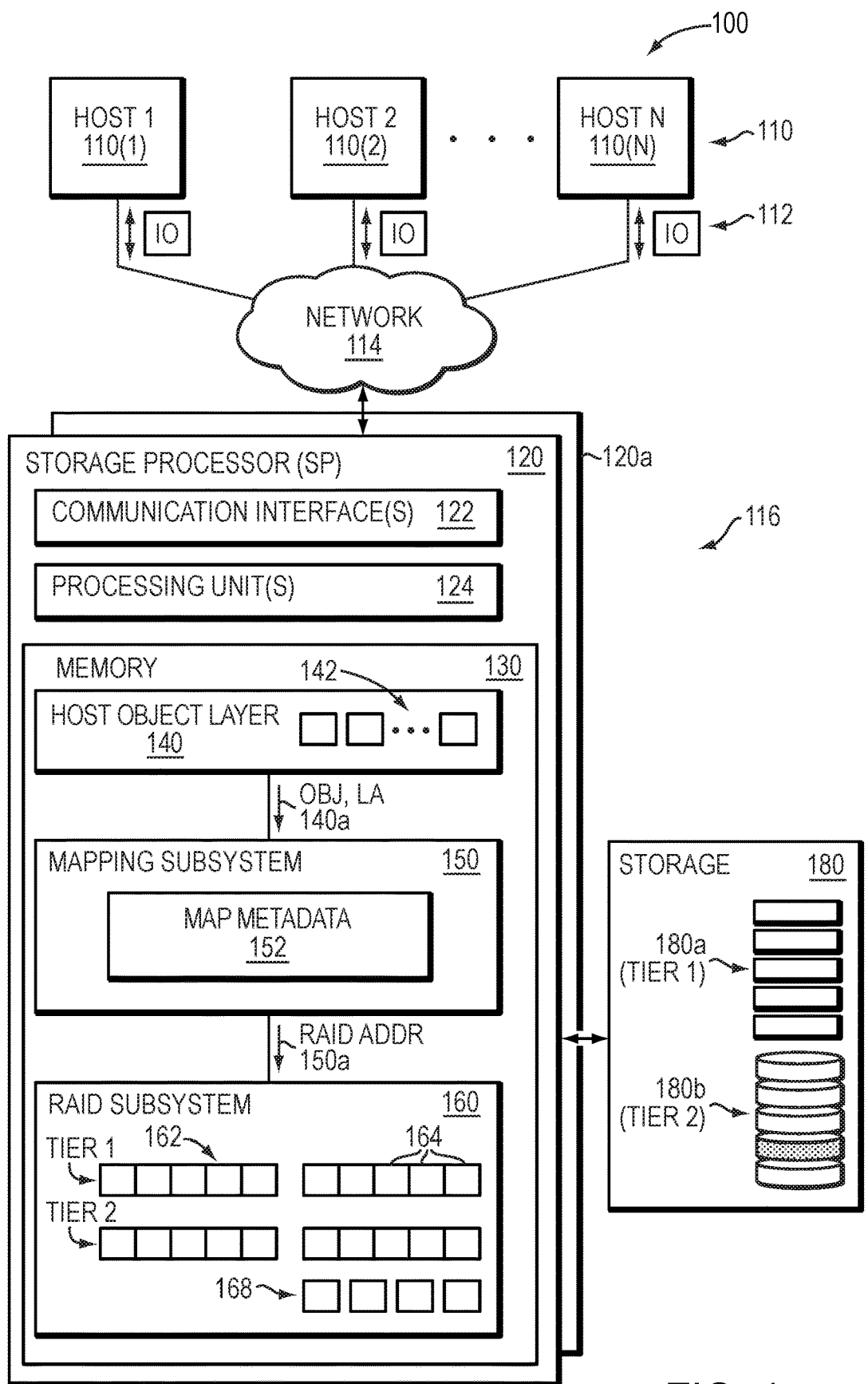
FIG. 1 is a block diagram of an example environment in which embodiments of the improved technique hereof can be practiced.

FIG. 1 shows an example environment 100 in which embodiments of the improved technique hereof can be practiced. Here, multiple host computing devices ("hosts") 110 access a data storage system 116 over a network 114. The data storage system 116 includes a storage processor, or "SP," 120 and storage 180, such as magnetic disk drives, electronic flash drives, and the like. In some examples, the storage 180 is arranged in storage tiers (and in sets as will be discussed below), with each storage tier providing a respective quality of service. For example, the storage 180 may include a first storage tier 180a (Tier 1) backed by flash drives and a second storage tier 180b (Tier 2) backed by magnetic disk drives. Although two storage tiers are shown, the storage 180 may provide any number of storage tiers. Also, although five disk drives are shown in each tier, the storage 180 may include any number of disk drives in each tier. Different numbers of disk drives may be provided in different tiers. The particular numbers of drives shown in the figure are limited for the sake of simplicity.

The data storage system 116 may include multiple SPs like the SP 120 (e.g., a second SP 120a). In an example, multiple SPs may be provided as circuit board assemblies, or "blades," which plug into a chassis that encloses and cools the SPs. The chassis has a backplane for interconnecting the SPs, and additional connections may be made among SPs using cables. It is understood, however, that no particular hardware configuration is required, as any number of SPs may be provided, including a single SP, and the SP 120 can be any type of computing device capable of processing host IOs.

The network 114 may be any type of network or combination of networks, such as a storage area network (SAN), a local area network (LAN), a wide area network (WAN), the Internet, and/or some other type of network or combination of networks, for example. The hosts 110 may connect to the SP 120 using various technologies, such as Fibre Channel, iSCSI, NFS, and CIFS, for example. Any number of hosts 110 may be provided, using any of the above protocols, some subset thereof, or other protocols besides those shown. As is known, Fibre Channel and iSCSI are block-based protocols, whereas NFS and CIFS are file-based protocols. The SP 120 is configured to receive IO requests 112 (i.e., 112(1) through 112(N)) according to block-based and/or file-based protocols and to respond to such 10 requests 112 by reading or writing the storage 180.

The SP 120 is seen to include one or more communication interfaces 122, a set of processing units 124, and memory 130. The communication interfaces 122 include, for example, SCSI target adapters and network interface adapters for converting electronic and/or optical signals received over the network 114 to electronic form for use by the SP 120. The set of processing units 124 includes one or more processing chips and/or assemblies. In a particular example, the set of processing units 124 includes numerous multi-core CPUs. The memory 130 includes both volatile memory (e.g., RAM), and non-volatile memory, such as one or more ROMs, disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as an operating system, various applications, processes, and daemons.

As further shown in FIG. 1, the memory 130 "includes," i.e., realizes by operation of software instructions, a host object layer 140, a mapping subsystem 150, and a RAID subsystem 160. The host object layer 140 is constructed and arranged to provide access to host data objects 142, whose data are stored in the storage 180. The host data objects 142 may include, for example, host-accessible LUNs (Logical UNits), tile systems, virtual machine disks, and the like. Hosts 110 may access the data objects 142 over the network 114 by identifying the data object 142, e.g., by name or handle, and by specifying a logical address (LA) into the specified data object.

The mapping subsystem 150 is constructed and arranged to convert logical addresses 140a from the host object layer 140 into corresponding RAID addresses 150a in the RAID subsystem 160. The mapping subsystem 150 includes mapping structures (not shown) for organizing data objects, e.g., into blocks, files, and/or directories and the like (depending on the type of data object). The mapping subsystem 150 further includes map metadata 152 that provides information about data stored in the RAID subsystem 160 and locations of that, data. For example, as will be discussed further below, the map metadata 152 may associate logical address ranges of the set of data objects 142 with respective RAID stripes 162 managed by the RAID subsystem 160 that facilitates storage of the host data.

In an example, the map metadata 152 is stored in persistent memory (e.g., in storage 180), but portions thereof are maintained in volatile system memory to enable fast access. Also, although depicted as a simple table, one should appreciate that the map metadata 152 may have a multi-layer structure and may have any level of complexity. The example shown is intended merely to be illustrative.

The RAID subsystem 160 is constructed and arranged to organize host data of host-accessible data objects 142 in RAID stripes 162, which are addressed using RAID addresses 150a. Multiple RAID stripes 162 are shown, with the understanding that the RAID subsystem 160 may manage hundreds, thousands, or even millions of RAID stripes 162, for example. The stripes 162 may be derived from RAID groups (i.e., groups of disk drives arranged according to RAID protocols); however, this is not required. For example, the RAID subsystem 160 may provide RAID stripes 162 as part of a fully-mapped RAID system in which stripes 162 are created from free extents derived from disk drives in storage 180. Five extents 164 per stripe 162 are shown, although the number of extents 164 per stripe 162 may vary based on RAID configuration. The RAID subsystem 160 may maintain a pool of free extents 168. The free extents 168 are uncommitted to any RAID stripe 162 but are available as spares, e.g., in the event of a disk drive failure. For example, if a disk drive in storage 180 fails, the RAID subsystem 160 may identify any stripes 162 that include extents 164 backed by the failed disk drive and may then proceed to repair those damaged stripes using RAID protocols. Repairing a damaged RAID stripe generally entails rebuilding the data of the damaged extent onto a spare extent and replacing the damaged extent with the rebuilt spare extent in the RAID stripe. Operation of the RAID stripe may then continue, with full redundancy restored.

Additionally, the RAID groups and/or RAID stripes 162 discussed above derive from disk drives arranged on one of the tiers in one of a plurality of sets. For example, in one embodiment, each set includes a number of disk drives arranged on one of the respective tiers. Further, each respective set is configured to be mutually exclusive with respect to other sets such that disk drives within the same set provide the basis for the formation of a RAID group and/or RAID stripes 162. Therefore, it should be understood that RAID groups and/or RAID stripes 162 cannot derive from disks drives in different sets. As a result, these sets allow for the limiting of the failure domain to a smaller number of disk drives than the total number of disk drives in that tier and/or system. If employed with an appropriate number of disk drives, the set concept significantly improves the reliability of any given set to above six 9s of reliability.

In an example operation, the hosts 110 issue IO requests 112 to the data storage system 116. The IO requests 112 include requests to read, and write specified locations (LAs) of host data of host-accessible data objects 142. The SP 120 receives the IO requests 112 at the communication interfaces 122 and initiates further processing. For example, the mapping subsystem 150 maps the logical addresses of the specified data objects 142 to corresponding RAID addresses 150a (e.g., stripes 162), and the RAID subsystem 160 maps the RAID addresses 150a to corresponding disk drive locations in storage 180, where the requested read or write operations take place. As the mapping subsystem 150 performs its mapping and other functions, the mapping subsystem 150 maintains map metadata 152, e.g., by populating information in a table. Also, the map metadata 152 may store information about only a subset of data objects 142, including a single data object 142. Further, the map metadata 152 may populate information for certain LA ranges but not others. Thus, there is no requirement that the map metadata 152 be fully populated.

Figure 2:
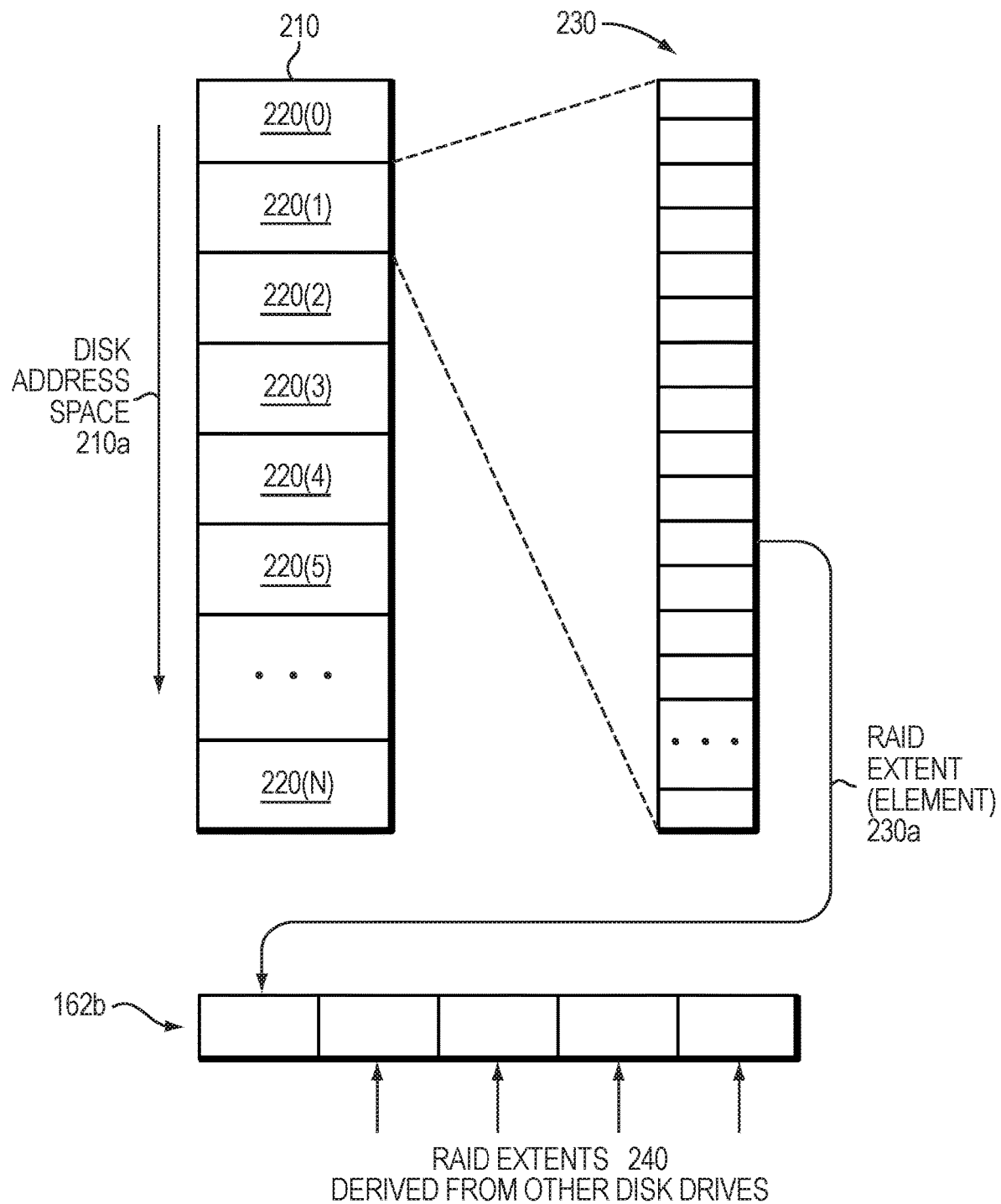
FIG. 2 is a block diagram showing an example arrangement for forming RAID stripes in the environment of FIG. 1.

FIG. 2 shows an example arrangement for constructing RAID stripes 162 from disk drives in storage 180, in accordance with example embodiments hereof. Here, a disk drive 211) (from storage 80 in one of the sets) has a disk address space 210a. The disk drive 210 is divided or otherwise partitioned into regions 220(0) through 220(N), where each region is a large, contiguous range of storage, which may be 256 MB or 1 GB in size, for example. As shown for region 220(1), each region 220 itself is divided or otherwise partitioned into a number of extents 230 (also called elements). In an example, each extent 230 may be 1 MB or 2 MB, for example, Extents 230 are then available to the RAID subsystem 160 in forming stripes 162. For example, RAID extent 230a forms a first extent in a five-member RAID stripe 162b, the other extents 240 of which are preferably derived from other disk drives in the same set. Any number of RAID stripes 162 may be formed in this manner, limited only by the number and capacity of disk drives in storage 180.

Figure 3:
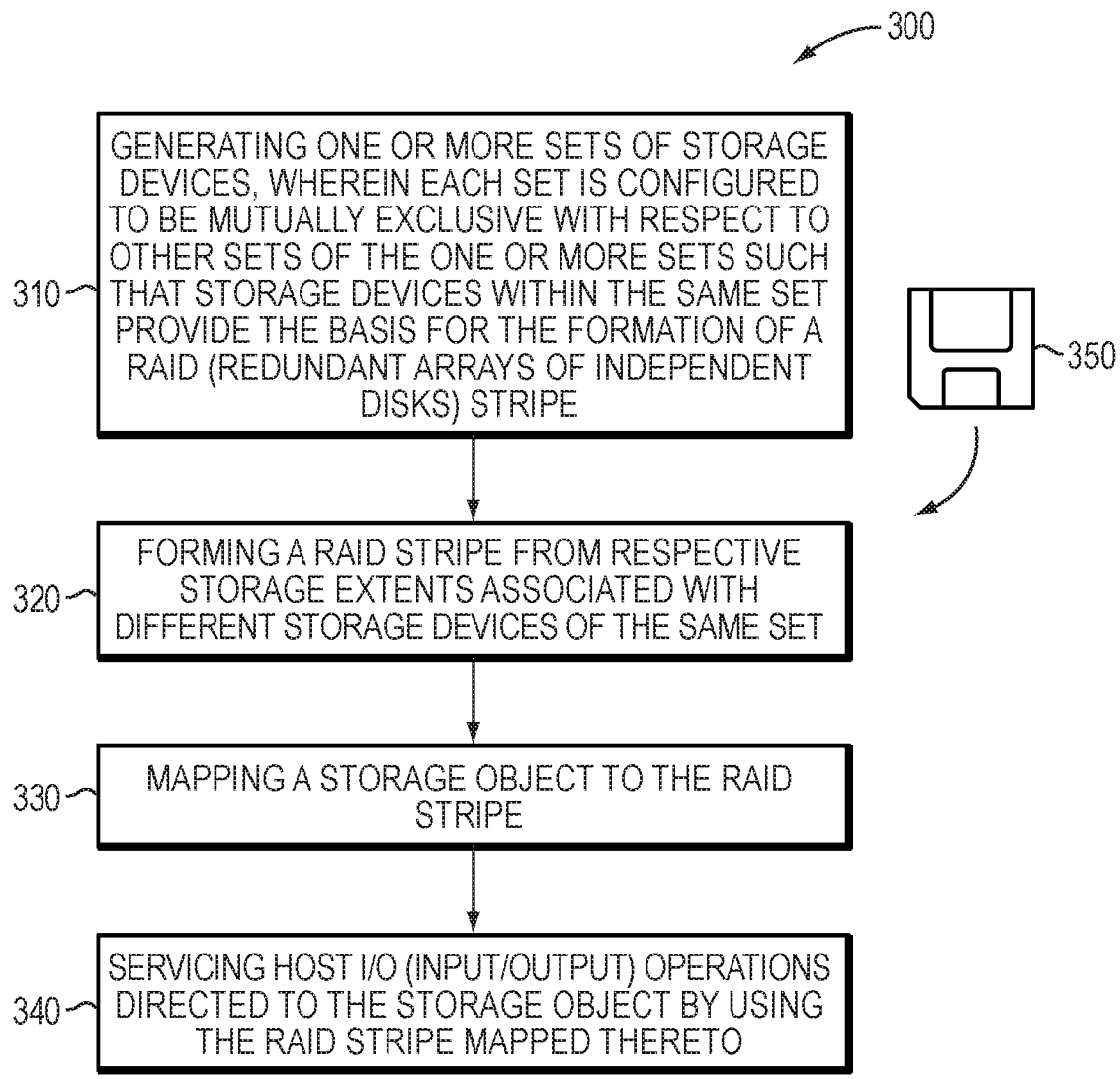
FIG. 3 is a flowchart showing an example method of managing data storage.

FIG. 3 shows an example method 300 that may be carried out n connection with the environment 100. The method 300 typically performed, for example, by the software constructs described in connection with FIG. 1, which reside in the memory 130 of the storage processor 120 and are run by the set of processors 124. The various acts of method 300 may be ordered in any suitable way. Accordingly, embodiments may be constructed in which acts are performed in orders different from that illustrated, which may include performing some acts simultaneously.

At 310, one or more sets of storage devices (e.g., disk drives in storage 180) is generated. Each set is configured to be mutually exclusive with respect to other sets of the one or more sets such that storage devices within the same set provide the basis for the formation of a RAID (Redundant Arrays of Independent Disks) stripe. At step 320, a RAID stripe (e.g., stripe 162) is formed from respective storage extents (e.g., extents 164) associated with different storage devices of the same set, At 330, a storage object (e.g., object 142) is mapped to the RAID stripe. At 340, host I/O (Input/Output) operations directed to, the storage object are serviced, by using the RAID stripe mapped thereto.

In exemplary embodiments, it should be understood that each tier in a data storage system will have its own sets such that when a tier is created for the first time the sets are also generated. For example, with respect to a tier, there may be a set size of 25 drives, meaning that the first 25 drives in the tier would be in the, first set, and the next 25 drives in the tier would be in the next set, and so on. The set configuration will then be persisted along with the rest of the RAID configuration.

Furthermore, it should be understood that the sets may be dynamically and automatically updated as storage devices are added to or removed from the data storage system. For example, each set may have an upper and a lower limit that controls the number of storage devices within a set. Suppose the lower limit is 6 and the upper limit is 25. If the number of storage devices falls below the lower limit of 6 as a result, for example, of the removal of one or more storage devices from the set, a storage device may be added from another set provided that set does not fall below the lower limit associated with that particular set. For example, suppose a storage device fails in a set with a lower limit of 6 devices, and the set now has only 5 devices. It is, therefore, necessary to add one more, storage device to the set with 5 devices. This is achieved by removing a storage device from an existing set and then adding it to the set with 5 storage devices. In this case, it is necessary to restripe the set that is losing the storage device. The set that is gaining the storage device does not need to restripe since it is gaining the storage device but it may do so nonetheless if it wants to evenly distribute stripes among the devices in the set.

Additionally, it should be understood that if one or more new storage devices are added to the data storage system, the sets may also be updated by attempting to fill the sets with as many of the new storage devices as possible. For example, if a set includes the scope to add all of the new storage devices without exceeding the upper limit then all of the new storage devices are assigned to that particular set. However, if by filling a set to its upper limit with new storage devices, the number of remaining new storage devices is insufficient to satisfy a lower limit of a second set, then the number added to the first set will have to be balanced against the need to have a sufficient amount of new storage devices to meet the lower limit of the second set. For example, suppose the requirement is to have all sets with a lower limit of 6 and an upper limit of 25 and a first set currently has 24 data storage devices. If 55 storage devices are added to the data storage system, this will result in the first set receiving one additional device to reach the upper limit of 25. A second set will also be generated with a further 25 of the new storage devices assigned thereto. This leaves 29 new storage devices. However, if a further third set of 25 new storage devices is generated, this will leave 4 new storage devices remaining which is insufficient to meet a lower limit of a fourth set. Thus, the third set is generated with 23 of the new storage devices which allows a fourth set to be generated with 6 of the new storage devices. The fourth set, therefore, satisfies the lower limit requirement of 6 devices.

Moreover, it should be understood that the RAID subsystem 160 is also configured to decide which set to allocate new storage from and how to choose the storage devices within a set to place newly provisioned storage. For example, when new storage needs to be allocated, a set is first chosen from which to allocate storage. There may be many possible policies but one policy decides to choose the set with the device that has the most available storage. It will then choose the best extents to combine with this device based on utilization and/or wear. It should be understood, for example, that SSDs have an attribute of wear since the devices have a characteristic where they wear as you write to them. As a result, an attempt is made to group together extents from devices with similar wear in the same stripe. Typically, wear is measured by percentage of write lifetime remaining where 0 is fully worn, and 100 is not worn. Utilization is the amount of capacity consumed on a device. Again, it may be measured as a percentage such that 0% represents no capacity consumed and 100% represents all capacity consumed. The device that is least consumed is initially selected since it is important to use capacity, evenly across all the devices in order to wear all drives evenly and distribute storage across all the devices. If storage is not distributed across all the devices evenly it may end up with cases where storage cannot be fully consumed on a device since there is insufficient extents to combine.

Additionally, it should be understood that as storage devices fail in the data storage system, the RAID subsystem 160 will dynamically choose extents to swap in for failed extents. Again, the set concept comes into play here because it is necessary to make sure that failed extents are replaced with extents from storage devices which are in the same set. The spares may be selected based on wear and/or utilization in a similar manner as discussed above.

Furthermore, it should be understood that as part of wear management, the RAID subsystem 160 makes sure that worn extents are replaced with, extents from devices in the same set as the worn devices. As new extents are provisioned, the RAID subsystem 160 makes sure that wear is evenly distributed among the sets and also within the sets. For example, where a device has worn out it is needed to select spares to replace the worn extents. In this case, spares are selected from the same set as the device that has worn based again on wear and/or utilization. This ensures that spares are evenly allocated from the sets.

Although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 350 in FIG. 3). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements or aspects of something in an open-ended fashion. Also as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a second event may take place before or after a first event, or even if no first event ever occurs. In addition, an identification herein of a particular element, feature, or act as being a "first" such element, feature, or act should not be construed as requiring that there must also be a "second" or other such element, feature or act. Rather, the "first" item may be the only one, Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method, comprising:
   generating one or more sets of storage devices, wherein each set is configured to be mutually exclusive with respect to other sets of the one or more sets such that storage devices within the same set provide the basis for the formation of a RAID (Redundant Arrays of Independent Disks) stripe;
   forming a RAID stripe from respective storage extents associated with different storage devices of the same set;
   mapping a storage object to the RAID stripe;
   servicing host I/O (Input/Output) operations directed to the storage object by using the RAID stripe mapped thereto; and
   generating a first set of storage device, wherein generating the first set of storage devices includes:
      upon addition of one or more new storage devices, determining if any further storage devices can be added to the first set by evaluating the current amount of storage devices in the first set and an upper limit of storage devices that represent a maximum number of storage devices that can be included in the first set, in the event of determining that further storage devices can be added to the first set, determining an amount of the new storage devices to be added to the first set such that the amount of determined to be added to the first set fills the first set by as much as is possible given the number of new storage devices and the upper limit of the first set except in the situation where such an amount would leave an amount of new storage devices remaining that is insufficient to meet a lower limit of a second set in which case the amount to be added to the first set is balanced against the amount needed to satisfy the lower limit associated with the second set, and added the amount of the new storage devices to the first set.

2. The method as claimed in claim 1, wherein generating the one or more sets includes setting an upper limit and a lower limit of storage devices for each set in order to control the number of storage devices that can be included within the respective sets.

3. The method as claimed in claim 1, wherein a first and a second set of storage devices are generated; and further comprising:

upon removal of one or more storage devices from the first set, determining that the number of storage devices within the first set is less than a lower limit of storage devices that represents a minimum number of storage devices that can be included in the first set;

in response to the said determination, adding at least one storage device from the second set to the first set provided the loss of the at least one storage device from the second set does not cause the number of storage devices in the second set to be less than a lower limit of storage devices that represents a minimum number of storage devices that can be included in the second set; and copying data stored on the at least one storage device to at least one of the remaining storage devices in the second set.

4. The method as claimed in claim 1, wherein an amount of the new storage devices remain after determining the amount of new storage devices to add to the first set; and further comprising:

determining if the remaining amount of the new storage devices can be added to a second set by evaluating at least one of the remaining amount of the new storage devices or the current amount of storage devices in the second set and at least one of a lower limit and an upper limit of storage devices that respectfully represent a minimum and a maximum number of storage devices that can be included in the second set; and in the event of determining that the remaining amount of the new storage devices can be added to the second set, adding the remaining amount of the new storage devices to the second set.

5. The method as claimed in claim 1, wherein a first set comprises a storage device that has not provided a storage extent to the RAID stripe; and further comprising:

detecting a failure in connection with a storage device that provides a storage extent to form the RAID stripe;

selecting the storage device that has not provided a storage extent to the RAID stripe based on wear and/or utilization in connection with the storage device; and rebuilding the RAID stripe by utilizing a storage extent from the selected storage device.

6. The method as claimed in claim 1, further comprising:

receiving a request for storage;

in response to receiving the request, selecting one of the one or more sets based on wear and/or utilization associated therewith; and forming a new RAID stripe from respective storage extents associated with different storage devices of the selected set in order to satisfy the request.

7. An apparatus, comprising:

memory; and processing circuitry coupled to the memory, the memory storing instructions which, when executed by the processing circuitry, cause the processing circuitry to:

generate one or more sets of storage devices, wherein each set is configured to be mutually exclusive with respect to other sets of the one or more sets such that storage devices within the same set provide the basis for the formation of a RAID (Redundant Arrays of Independent Disks) stripe;

form a RAID stripe from respective storage extents associated with different storage devices of the same set;

map a storage object to the RAID stripe;

service host I/O (Input/Output) operations directed to the storage object by using the RAID stripe mapped thereto; and generate a first set of storage devices, wherein generating the first set of storage devices includes:

upon addition of one or more new storage devices, determine if any further storage devices can be added to the first set by evaluating the current amount of storage devices in the first set and an upper limit storage devices that represents a maximum number of storage devices that can be included in the first set, in the event of determining that further storage devices can be added to the first set, determine an amount of the new storage devices to be added to the first set such that the amount determined to be added to the first set fills the first set by as much as is possible given the number of new storage devices and the upper limit of the first set except in the situation where such an amount would leave an amount of new storage devices remaining that is insufficient to meet a lower limit of a second set in which case the amount to be added to the first set is balances against the amount needed to satisfy the lower limit associated with the second set, and add the amount of the new storage devices to the first set.

8. The apparatus as claimed in claim 7, wherein generating the one or more sets includes setting an upper limit and a lower limit of storage devices for each set in order to control the number of storage devices that can be included within the respective sets.

9. The apparatus as claimed in claim 7, wherein a first and a second set of storage devices are generated; and further comprising instructions which, when executed by the processing circuitry, cause the processing circuitry to:

upon removal of one or more storage devices from the first set, determine that the number of storage devices within the first set is less than a lower limit of storage devices that represents a minimum number of storage devices that can be included in the first set;

in response to the said determination, add at least one storage device from the second set to the first set provided the loss of the at least one storage device from the second set does not cause the number of storage devices in the second set to be less than a lower limit of storage devices that represents a minimum number of storage devices that can be included in the second set; and copy data stored on the at least one storage device to at least one of the remaining storage devices in the second set.

10. The apparatus as claimed in claim 7, wherein an amount of the new storage devices remain after determining the amount of new storage devices to add to the first set; and further comprising instructions which, when executed by the processing circuitry, cause the processing circuitry to:

determine if the remaining amount of the new storage devices can be added to a second set by evaluating at least one of the remaining amount of the new storage devices or the current amount of storage devices in the second set and at least one of a lower limit and an upper limit of storage devices that respectfully represent a minimum and a maximum number of storage devices that can be included in the second set; and in the event of determining that the remaining amount of the new storage devices can be added to the second set, add the remaining amount of the new storage devices to the second set.

11. The apparatus as claimed in claim 7, wherein a first set comprises a storage device that has not provided a storage extent to the RAID stripe; and further comprising instructions which, when executed by the processing circuitry, cause the processing circuitry to:

detect a failure in connection with a storage device that provides a storage extent to form the RAID stripe;

select the storage device that has not provided a storage extent to the RAID stripe based on wear and/or utilization in connection with the storage device; and rebuild the RAID stripe by utilizing a storage extent from the selected storage device.

12. The apparatus as claimed in claim 7, further comprising instructions which, when executed by the processing circuitry, cause the processing circuitry to:

receive a request for storage;

in response to receiving the request, select one of the one or more sets based on wear and/or utilization associated therewith; and form a new RAID stripe from respective storage extents associated with different storage devices of the selected set in order to satisfy the request.

13. A computer program product having a non-transitory computer readable medium which stores a set of instructions, the set of instructions, when carried out by processing circuitry, causing the processing circuitry to perform a method of:

generating one or more sets of storage devices, wherein each set is configured to be mutually exclusive with respect to other sets of the one or more sets such that storage devices within the same set provide the basis for the formation of a RAID (Redundant Arrays of Independent Disks) stripe;

forming a RAID stripe from respective storage extents associated with different storage devices of the same set;

mapping a storage object to the RAID stripe;

servicing host I/O (Input/Output) operations directed to the storage object by using the RAID stripe mapped thereto:

generating a first set of storage devices, wherein generating the first set of storage devices includes:

upon addition of one or more new storage devices, determining if any further storage devices can be added to the first set by evaluating the current amount of storage devices in the first set and an upper limit of storage devices that represents a maximum number of storage devices that can be included in the first set, in the event of determining that further storage devices can be added to the first set, determining an amount of the new storage devices to be added to the first set such that the amount determined to be added to the first set fills the first set by as much as is possible given the number of new storage devices and the upper limit of the first set except in the situation where such an amount would leave an amount of new storage devices remaining that is insufficient to meet a lower limit of a second set in which case the amount to be added to the first set is balanced against the amount needed to satisfy the lower limit associated with the second set, and adding the amount of the new storage devices to the first set.

14. The computer program product as claimed in claim 13, wherein generating the one or more sets includes setting an upper limit and a lower limit of storage devices for each set in order to control the number of storage devices that can be included within the respective sets.

15. The computer program product as claimed in claim 13, wherein a first and a second set of storage devices are generated; and further comprising instructions, when carried out by processing circuitry, causing the processing circuitry to perform a method of:

upon removal of one or more storage devices from the first set, determining that the number of storage devices within the first set is less than a lower limit of storage devices that represents a minimum number of storage devices that can be included in the first set;

in response to the said determination, adding at least one storage device from the second set to the first set provided the loss of the at least one storage device from the second set does not cause the number of storage devices in the second set to be less than a lower limit of storage devices that represents a minimum number of storage devices that can be included in the second set; and copying data stored on the at least one storage device to at least one of the remaining storage devices in the second set.

16. The computer program product as claimed in claim 13, wherein an amount of the new storage devices remain after determining the amount of new storage devices to add to the first set; and further comprising instructions, when carried out by processing circuitry, causing the processing circuitry to perform a method of:

determining if the remaining amount of the new storage devices can be added to a second set by evaluating at least one of the remaining amount of the new storage devices or the current amount of storage devices in the second set and at least one of a lower limit and an upper limit of storage devices that respectfully represent a minimum and a maximum number of storage devices that can be included in the second set; and in the event of determining that the remaining amount of the new storage devices can be added to the second set, adding the remaining amount of the new storage devices to the second set.

17. The computer program product as claimed in claim 13, wherein a first set comprises a storage device that has not provided a storage extent to the RAID stripe; and further comprising instructions, when carried out by processing circuitry, causing the processing circuitry to perform a method of:
　　detecting a failure in connection with a storage device that provides a storage extent to form the RAID stripe;
　　selecting the storage device that has not provided a storage extent to the RAID stripe based on wear and/or utilization in connection with the storage device; and
　　rebuilding the RAID stripe by utilizing a storage extent from the selected storage device.

* * * * *